US011337137B2

(12) United States Patent
Bartell

(10) Patent No.: US 11,337,137 B2
(45) Date of Patent: May 17, 2022

(54) SELECTIVELY REROUTING NETWORK TRAFFIC IN A FIFTH GENERATION (5G) OR OTHER NEXT GENERATION NETWORK

(71) Applicant: AT&T Intellectual Property I, L.P., Atlanta, GA (US)

(72) Inventor: John Barry Bartell, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1 day.

(21) Appl. No.: 16/793,283

(22) Filed: Feb. 18, 2020

(65) Prior Publication Data

US 2021/0258855 A1   Aug. 19, 2021

(51) Int. Cl.
*H04L 12/24* (2006.01)
*H04W 40/28* (2009.01)
(Continued)

(52) U.S. Cl.
CPC ........... *H04W 40/28* (2013.01); *H04L 41/147* (2013.01); *H04L 45/02* (2013.01); *H04L 45/22* (2013.01);
(Continued)

(58) Field of Classification Search
CPC ........ H04L 45/22; H04L 45/24; H04L 47/28; H04L 47/39; H04L 47/365; H04L 47/2483; H04L 49/90; H04W 52/12
(Continued)

(56) References Cited

U.S. PATENT DOCUMENTS

| 6,757,270 B1 * | 6/2004 | Kumar | H04W 52/12 370/342 |
| 2011/0261837 A1 * | 10/2011 | Valk | H04L 47/365 370/474 |

(Continued)

FOREIGN PATENT DOCUMENTS

| EP | 3 306 873 A1 | 4/2018 |
| EP | 3 306 873 A1 | 11/2018 |
| EP | 3 570 524 A1 | 11/2019 |

OTHER PUBLICATIONS

Bartell "Selectively Sending Routing Information to Routing Devices in a Fifth Generation (5G) or Other Next Generation Network" U.S. Appl. No. 16/804,429, filed Feb. 28, 2020, 43 pages.
(Continued)

*Primary Examiner* — Harun Chowdhury
(74) *Attorney, Agent, or Firm* — Amin, Turocy & Watson, LLP

(57) ABSTRACT

The technologies described herein are generally directed toward shedding processing loads associated with route updates. For instance, a system can comprise a processor and a memory that can enable operations facilitating performance of operations including facilitating receiving a content item for transmission to a destination router device on a network. The operations can further comprise facilitating communicating, to a second routing device, a first portion of the content item. The operations can further comprise facilitating communicating, to a third routing device, a second portion of the content item. Further, operations can be performed for appending a separation indicator to at least one of the first portion or the second portion, wherein the separation indicator provides information that links the first portion to the second portion.

20 Claims, 10 Drawing Sheets

(51) Int. Cl.
*H04L 41/147* (2022.01)
*H04L 45/02* (2022.01)
*H04L 45/00* (2022.01)
*H04L 47/2483* (2022.01)
*H04L 47/28* (2022.01)
*H04L 49/90* (2022.01)
*H04W 40/24* (2009.01)
*H04W 40/36* (2009.01)

(52) U.S. Cl.
CPC .......... *H04L 47/2483* (2013.01); *H04L 47/28* (2013.01); *H04L 49/90* (2013.01); *H04W 40/248* (2013.01); *H04W 40/36* (2013.01)

(58) Field of Classification Search
USPC ................................. 370/252, 329, 474, 342
See application file for complete search history.

(56) References Cited

U.S. PATENT DOCUMENTS

2013/0077501 A1* 3/2013 Krishnaswamy ....... H04L 45/24
370/252

2017/0324849 A1 11/2017 Pfister et al.
2021/0037409 A1* 2/2021 Thorsen ................. H04L 45/22

OTHER PUBLICATIONS

Bartell, "Selectively Shedding Processing Loads Associated With Updates to a Routing Table in a Fifth Generation (5G) or Other Next Generation Network", U.S. Appl. No. 16/793,508, filed Feb. 18, 2020, 50 pages.

Bartell, et al. "Selectively Bypassing a Routing Queue in a Routing Device in a Fifth Generation (5G) or Other Next Generation Network", U.S. Appl. No. 16/794,534, filed Feb. 19, 2020, 46 pages.

Bartell, "Selectively Using a Co-Processor to Process Network Routing Information in a Fifth Generation (5G) or Other Next Generation Network", U.S. Appl. No. 16/804,521, filed Feb. 28, 2020, 54 pages.

Bartell, et al. "Establishing Domains of Authority for Routing Table Updates Between Routing Devices in a Fifth Generation (5G) or Other Next Generation Network", U.S. Appl. No. 16/804,568, filed Feb. 28, 2020, 55 pages.

International Search Report and Written Opinion received for PCT Application Serial No. PCT/US2021/018408 dated Jun. 21, 2021, 12 pages.

International Search Report and Written Opinion for International Application No. PCT/US2021/018408 dated Jun. 4, 2021, 12 pages.

* cited by examiner

SELECTIVELY REROUTING NETWORK TRAFFIC IN A FIFTH GENERATION (5G) OR OTHER NEXT GENERATION NETWORK

TECHNICAL FIELD

The subject application is related to computer networking, and, for example, to using a router to reroute network traffic in a fifth generation (5G) or other next generation network.

BACKGROUND

As networks expand to handle larger amounts of information, the need for rapid and efficient routing within networks continues to increase. With increasing amounts of information communicated via networks, routing problems can occur when network traffic is buffered and rerouted.

With traditional routing strategies, to attempt to improve the routing of network traffic, routing devices can receive routing information from other routing devices with information about the speed of different routes. When better routes are detected, routing devices can attempt to reroute network traffic to try to utilize a better route. With some approaches to rerouting, even if a better route for network traffic can be determined, rerouting network traffic can lead to inefficiencies, including dropped packets and the reordering of packets received at a destination out or order.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
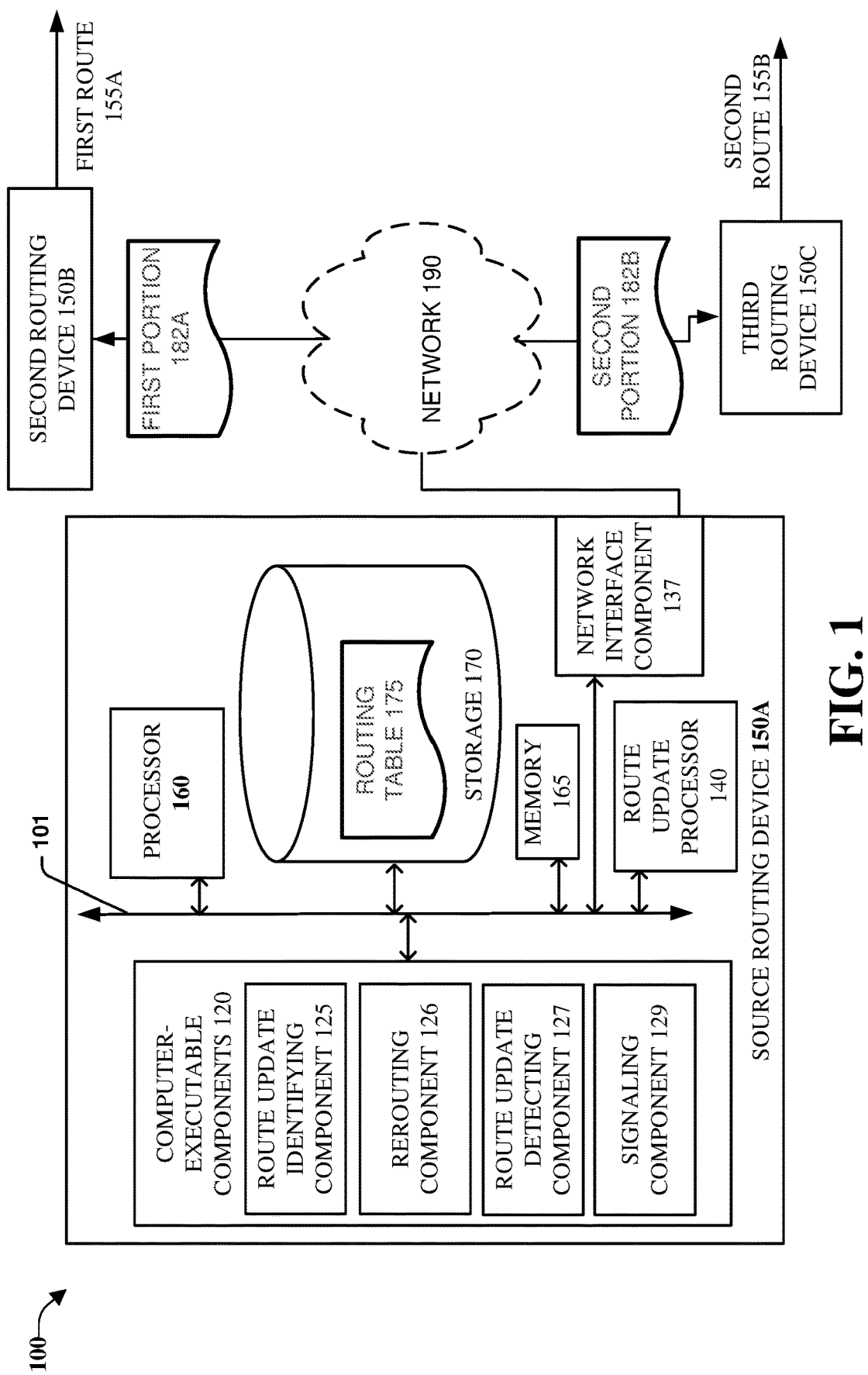
FIG. 1 is an architecture diagram of an example system that can facilitate selectively rerouting content items from a first route to a second route, in accordance with one or more embodiments.

Generally speaking, in one or more embodiments, can provide improved routing among multiple routing devices, in fifth generation (5G) or other next generation networks. In addition, one or more embodiments described herein can be directed towards a multi-connectivity framework that supports the operation of New Radio (NR, sometimes referred to as fifth generation (5G)) As will be understood, one or more embodiments can allow an integration of user equipments (UEs) with network assistance, by supporting control and mobility functionality on cellular links (e.g. LTE or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" are used herein. These terms may be used interchangeably, and refer to any type of network node that can serve user equipment and/or be connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc. As noted above, some embodiments are described in particular for 5G new radio systems. The embodiments are however applicable to any radio access technology (RAT) or multi-RAT system where the user equipment operates using control signals, e.g. LTE FDD/TDD, WCMDA/HSPA, GSM/GERAN, Wi Fi, WLAN, WiMax, CDMA2000, etc.

In some embodiments the non-limiting term router or routing device is used. This term can refer to any type of electronic device that can facilitate the connection of one or more nodes to a network, and between two or more nodes in the network. It should further be noted that, one or more embodiments used in examples herein utilize routers that employ an approach to network connectivity that is based on minimizing delay by employing large numbers of route updates throughout the network, e g, minimizing delay in a network route by making available frequently updated information about the network routes, e.g., transmission and queue delays.

One approach to implementing embodiments of this delay-minimizing approach to routing is to have routers frequently generate route updates for other routers. One aspect of this approach to routing is that it can utilize a router to process up to millions of route updates per second, and, as an improved approach to route update forwarding, one or more of the embodiments described herein can use different criteria to selectively forward route updates to other nodes. Notwithstanding the relationship between embodiments of this network routing approach and embodiments of handling route updates by routers described herein, the combinations of features described in one or more embodiments, and recited in the claims below, can be applied to other approaches to network routing beyond approaches described in one or more of the examples used herein.

One having skill in the relevant art(s), given the disclosure herein, will appreciate that one or more embodiments can be configured to generate frequent routing updates for network conditions, with a discounting the value of routing information in some circumstances, e.g., over time. Further, based on the frequency of route updates generated by nodes (e.g., synchronized route updates flooding network 300 every 10 ms, in an example, and other updates being asynchronously generated based on events) it should be appreciated that, in different implementations, the number of route updates evaluated per second can range into the hundreds of thousands, with smaller and larger implementations being available.

In example approaches to routing that can beneficially employ one or more embodiments described herein, routing devices can perform a variety of operations on routing updates, including, but not limited to, receiving updates, rapidly processing route updates, using processed route updates to direct network traffic to routes that can reduce delays, and determining whether to forward routing updates to other routing devices. As discussed further herein, in some circumstances, when a route update indicates that a better route exists from a source node to a destination node, one or more embodiments can reroute a content item during transmission from one route to a different route.

FIG. 1 is an architecture diagram of an example system 100 that can facilitate selectively rerouting content items from first route 155A to second route 155B, in accordance with one or more embodiments. For purposes of brevity, description of some elements and/or processes of embodiments discussed further below are omitted in this discussion of FIG. 1. System 100 can include source routing device 150A connected via network 190 to second routing device 150B and third routing device 150C. Connected via bus 101, source routing device 150A can include computer-executable components 120, processor 160, route update processor 140, storage 170, and memory 165. Computer executable components 120 can include route update identifying component 125, rerouting component 126, route update detecting component 127, signaling component 129, and other computer-executable components 120 that can be used to implement aspects of system 100, as described herein.

In some embodiments, memory 165 can comprise volatile memory (e.g., random access memory (RAM), static RAM (SRAM), dynamic RAM (DRAM), etc.) that can employ one or more memory architectures. Further examples of memory 165 are described below with reference to system memory 1004 of FIG. 10 discussed below. In some embodiments, storage 170 can comprise non-volatile memory (e.g., read only memory (ROM), programmable ROM (PROM), electrically programmable ROM (EPROM), electrically erasable programmable ROM (EEPROM), etc.) that can employ one or more storage architectures. Such examples of memory 165 and storage 170 can be employed to implement any embodiments of the subject disclosure described or suggested by disclosures herein.

According to multiple embodiments, processor 160 can comprise one or more processors and/or electronic circuitry that can implement one or more computer and/or machine readable, writable, and/or executable components and/or instructions that can be stored using memory 165 and storage 170. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processor 902 of FIG. 9 below, and processing unit 1004 of FIG. 10 discussed below. Such examples of processor 160 can be employed to implement any embodiments of the subject disclosure.

It should be noted that, in the example of FIG. 1, and throughout this disclosure, route update processor 140 is listed separately from processor 160, and this is because route updates can, in one or more embodiments, be processed by different types of processors, e.g., collections of graphics processing units (GPUs), for example. Different reasons why this is done by some implementations include the volume of route updates that can be used by one or more embodiments to rapidly select alternate routes for rerouting, in accordance with one or more embodiments.

According to multiple embodiments, memory 165 can store one or more computer and/or machine readable, writable, and/or executable components and/or instructions 120 that, when respectively executed by processor 160, can facilitate performance of operations defined by the executable component(s) and/or instruction(s). For example, memory 165 and storage 170 can store computer and/or machine readable, writable, and/or executable components 120 and/or instructions that, when executed by processor 160, can facilitate execution of the various functions described herein relating to source routing device 150A, e.g. route update identifying component 125, rerouting component 126, route update detecting component 127, signaling component 129, and other computer-executable components 120 that can be used to implement aspects of system 100, as described herein. Each of these components are described in detail, with one or more embodiments described below.

Generally, applications (e.g., computer-executable components 120) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, handheld computing devices, microprocessor-based or programmable consumer electronics, and the like, each of which can be operatively coupled to one or more associated devices It should be appreciated that the embodiments of the subject disclosure depicted in various figures disclosed herein are for illustration only, and as such, the architecture of such embodiments are not limited to the systems, devices, and/or components depicted therein. For example, in some embodiments, source routing device 150A can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

As described further below, in one or more embodiments memory 165 can store executable instructions that, when executed by the processor can facilitate performance of operations that can implement one or more embodiments described herein. For example, in one or more embodiments, the operations can implement network interface component 137 that can facilitate receiving a content item for transmission to a destination router device on a network.

In one or more embodiments, memory 165 can further store executable instructions that, when executed by the processor can facilitate performance of operations that can utilize network interface component 137 to facilitate communicating, to a second routing device, a first portion of the content item. In one or more embodiments, memory 165 can further store executable instructions that, when executed by the processor can facilitate performance of operations that can utilize network interface component 137 to facilitate communicating, to a third routing device, a second portion of the content item. In another example, in one or more embodiments, the operations can further implement signaling component 129 that can facilitate appending a separation indicator to at least one of the first portion or the second portion, with the separation indicator provides information that links the first portion to the second portion.

In additional embodiments, memory 165 can store executable instructions that, when executed by the processor can facilitate performance of operations that can implement rerouting component 126 that can facilitate dividing the content item into the first portion of the content item and the second portion of the content item, based on an indication to reroute the content item from a first route to the destination router device to a second route to the destination. In an additional example, memory 165 can store executable instructions that, when executed by the processor can facilitate performance of operations that can implement one or more embodiments described herein. For example, in one or more embodiments, the operations can implement route update identifying component 125, which can identify a route update based on a routing update specifying the second route to the destination router device satisfies a criterion, e.g., based on an indication to reroute the content item. An example criterion can be satisfied by the second route being predicted to deliver the content item to the destination router device with a shorter transit time than a longer transit time predicted to deliver the content item to the destination router device by the first route.

Figure 2:
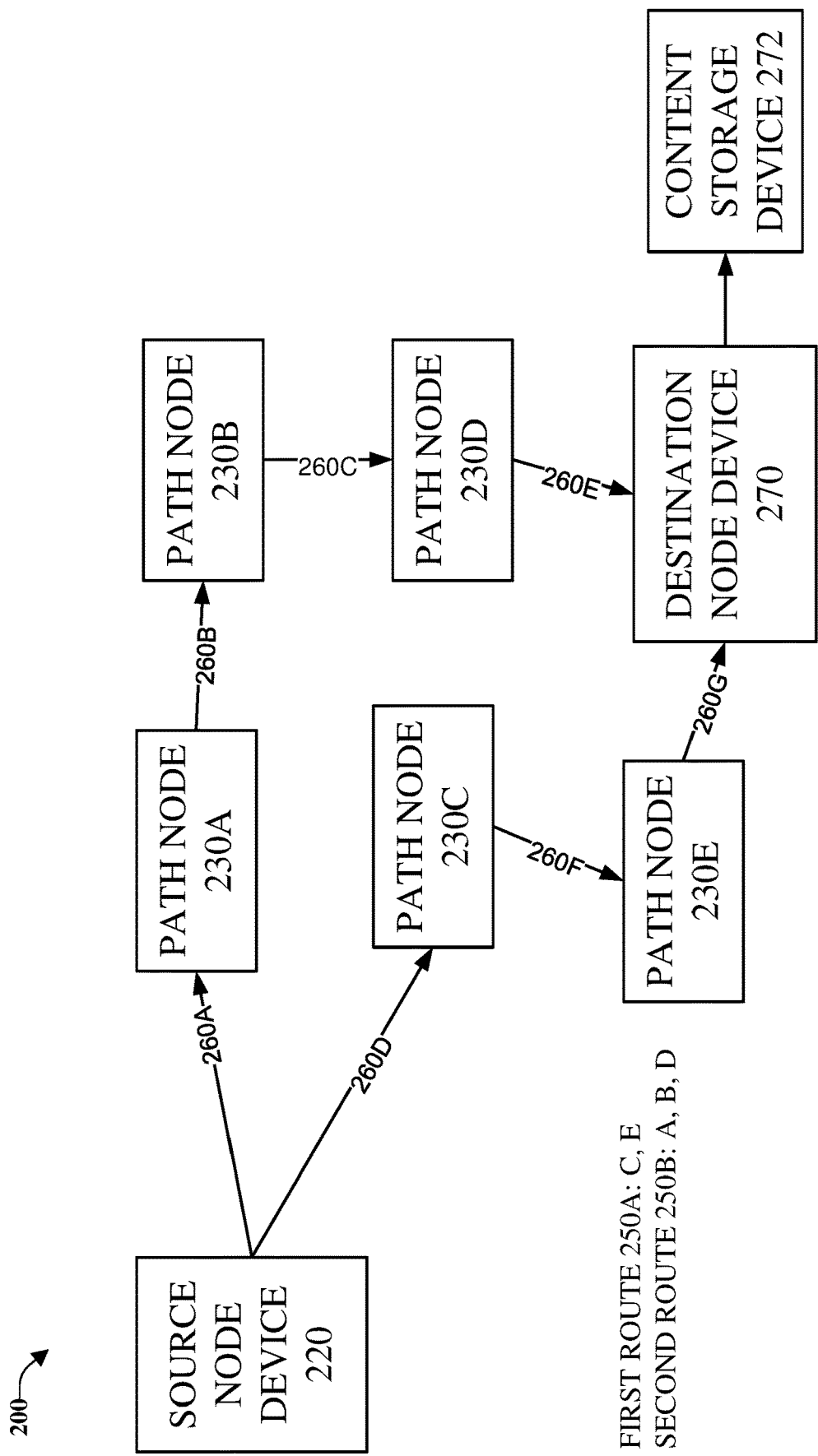
FIG. 2 illustrates an example node diagram of a network with components that implement a system for selectively rerouting content being communicated from a source node device to a destination router device, via either a first route or a second route, in accordance with one or more embodiments.

FIG. 2 illustrates an example node diagram of a network 200 with components that implement a system for selectively rerouting content being communicated from source node device 220 to destination router device 270, via either first route 250A or second route 250B, in accordance with one or more embodiments. For purposes of brevity, description of like elements and/or processes employed in other embodiments is omitted.

Network 200 is depicted as including source node 220, destination router device 270 with available connections to content storage device 272, path nodes 230A-E, and links 260A-G between variously depicted nodes. One having skill in the relevant art(s), given the description herein will appreciate that FIG. 2 depicts elements that can be used to illustrate different approaches to rerouting traffic in network 200. In this example, each depicted node device has a router, and, in accordance with network routing protocols, packets traveling from source node 220 to destination 270 pass through some of path nodes 230A-E along a route. Example routes 250A-B are listed on FIG. 2, and include example routes from source node 220 node to destination 270 node.

In one or more embodiments, nodes in example network 200 can provide route updates about neighboring link to neighboring nodes. For example, upon different events discussed described further below, path node 230A can provide information to neighboring nodes (e.g., source node 220 and path node 230B) about conditions associated with links about which it has information. As discussed further below, in one or more embodiments, nodes can have information about different links, both information about links directly from the node, e.g., links 260A-B.

One having skill in the relevant art(s), given the disclosure herein will appreciate that because, in one or more embodiments, route updates can be flooded through the network, it can provide performance improvements to the system to selectively limit the forwarding of updates to router devices that will use and not discard the information. In one or more embodiments, rerouting can switch between first route 250A to second route 250B, e.g., based on a route update received by source node device 220 that predicts second route 250B is a faster route than first route 250A.

In an example that can be illustrated with network 200 of FIG. 2, route information can be identified by source node 220 that can provide routing information about a route between source node 220 and destination router device 270. In FIG. 2, two routes are identified, two of which utilize link 260E, between path node 230D and destination router device 270. This information can be identified by source node 220 in a variety of ways, including, but not limited to, receiving it from another node (e.g., path node 230D can discover this information about an immediate link 260E) and relay this route update 205 via path node 230 to source node 220. In another example, router device 220 can detect the malfunctioning link 260E and send route update 205 to path node 230E, where this route update can be further forwarded to path node 230C and source node 220.

One having skill in the relevant art(s), given the description herein, would appreciate other ways that the network information about link 260E can be identified by source node 220. It should be appreciated that route information that can be used by one or more embodiments is not limited to this example, and can be any information relevant to network 200 routing, at current time and in the future.

Figure 3:
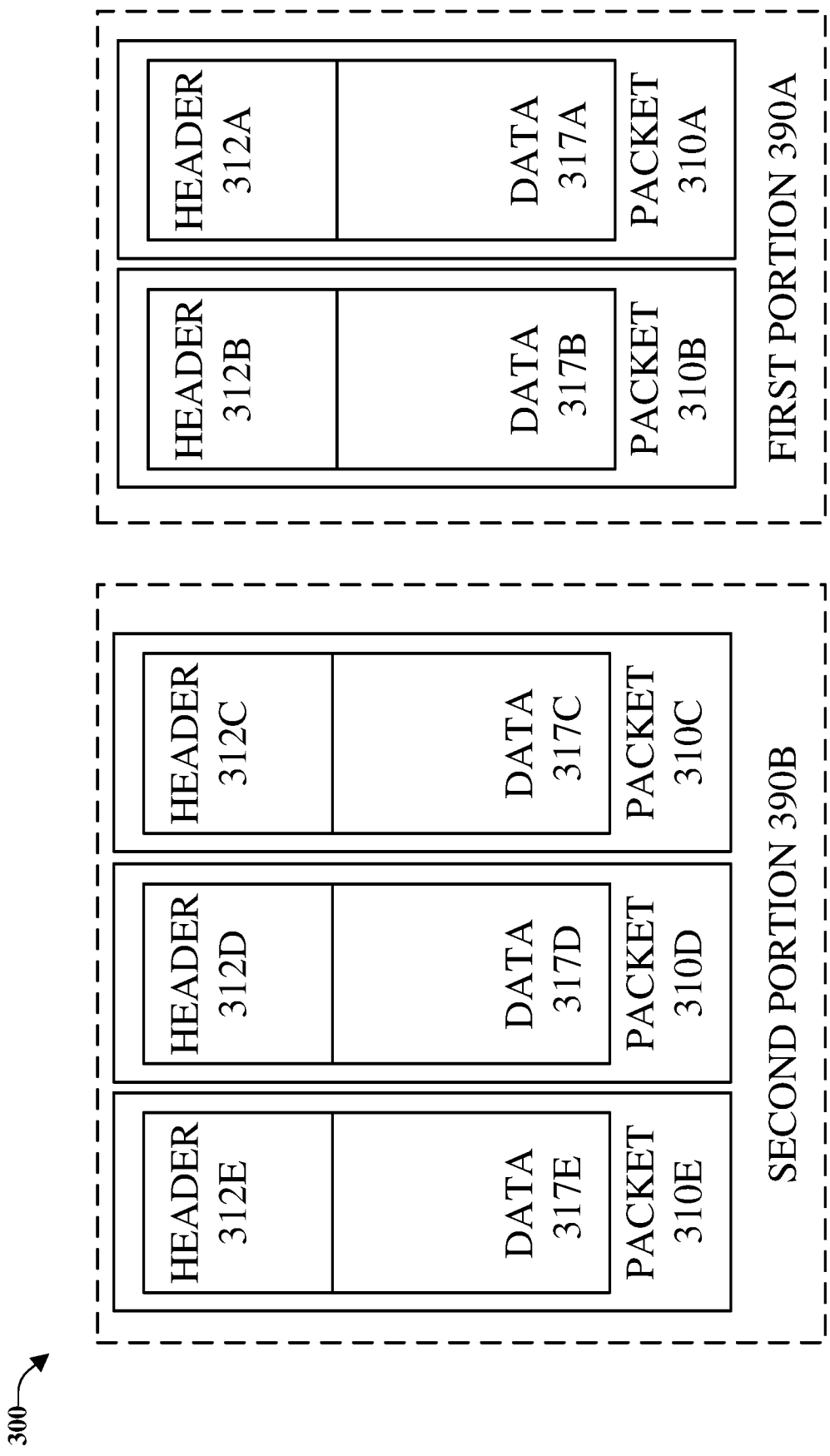
FIG. 3 illustrates an example of a plurality of packets that can be used to communicate a content item over a network from the source node device to the destination router device, via either the first route or the second route, in accordance with one or more embodiments.

FIG. 3 illustrates an example of a plurality of packets 310A-E that can be used to communicate content item 300 over network 190 from source node device 220 to destination router device 270, via either first route 250A or second route 250B, in accordance with one or more embodiments. For purposes of brevity, description of like elements and/or processes employed in other embodiments is omitted. As depicted, content item 300 is composed of two portions 390A-B, with first portion 390A being packets 310A-B, and second portion 390B being packets 310C-E. Each packet 310A-E include respective headers 312A-E and data 317A-E.

In one or more embodiments, as noted above, content items during transmission via a route can be divided into a plurality of tagged portions to facilitate rerouting. One approach to this division of a content item can use characteristics of packet switched network to facilitate the division. For example, one having skill in the relevant art(s), given the disclosure herein, would appreciate that content item 300 can be communicated via network 190 by dividing the content item into packets 310A-E in accordance with a packet switched protocol, e.g., Transfer Control Protocol/Internet Protocol (TCP/IP). As packets are being received by a router (e.g., source router device 220) and relayed to another router (e.g., path node 230A along a route (e.g., first route 250A), when a determination is made to switch from one route to an alternate route (e.g., second route 250B), packets 310A-E can be used to further divide the content item into portions (e.g., first portion 390A and second portion 390B), in accordance with one or more embodiments.

As discussed above, the division of packets 310A-E of content item 300 into portions can facilitate switching network routes during the relaying of the content item by source node device 220. For example, in one or more embodiments, packet 310A can be received by source node device 220 and network routing table 175 can be utilized to select path node 230A as the next hop in first route 250A. Packet 310A can then be relayed via link 260A from source node device 220 to path node 230A. Continuing the transmission of content item 300, packet 310B can be received by source node device 220 and path node 230A can be selected as the next hop in first route 250A. Like packet 310A, packet 310B can be relayed along first route 250A via link 260A, from source node device 220 to path node 230A.

In a non-limiting example, during the relaying process for packet 310B described above, a route update can be received by source node device 220 that indicates that second route 250B is preferable to first route 250A for communicating to destination node 270. Based on this route update, a rerouting process can be triggered that will end transmission of the packets of content item 300 via first route 250A an continue transmission of the sequence of packets via second network 250B. Based on this rerouting, packet 310C can be received by source node device 220 and second route 250B can specify that path node 230C can be the next hop for packet 310C. Thus, this process can be considered as a division of content item 300 in to two portions 390A-B, each of which are relayed on a different network route.

Figure 4:
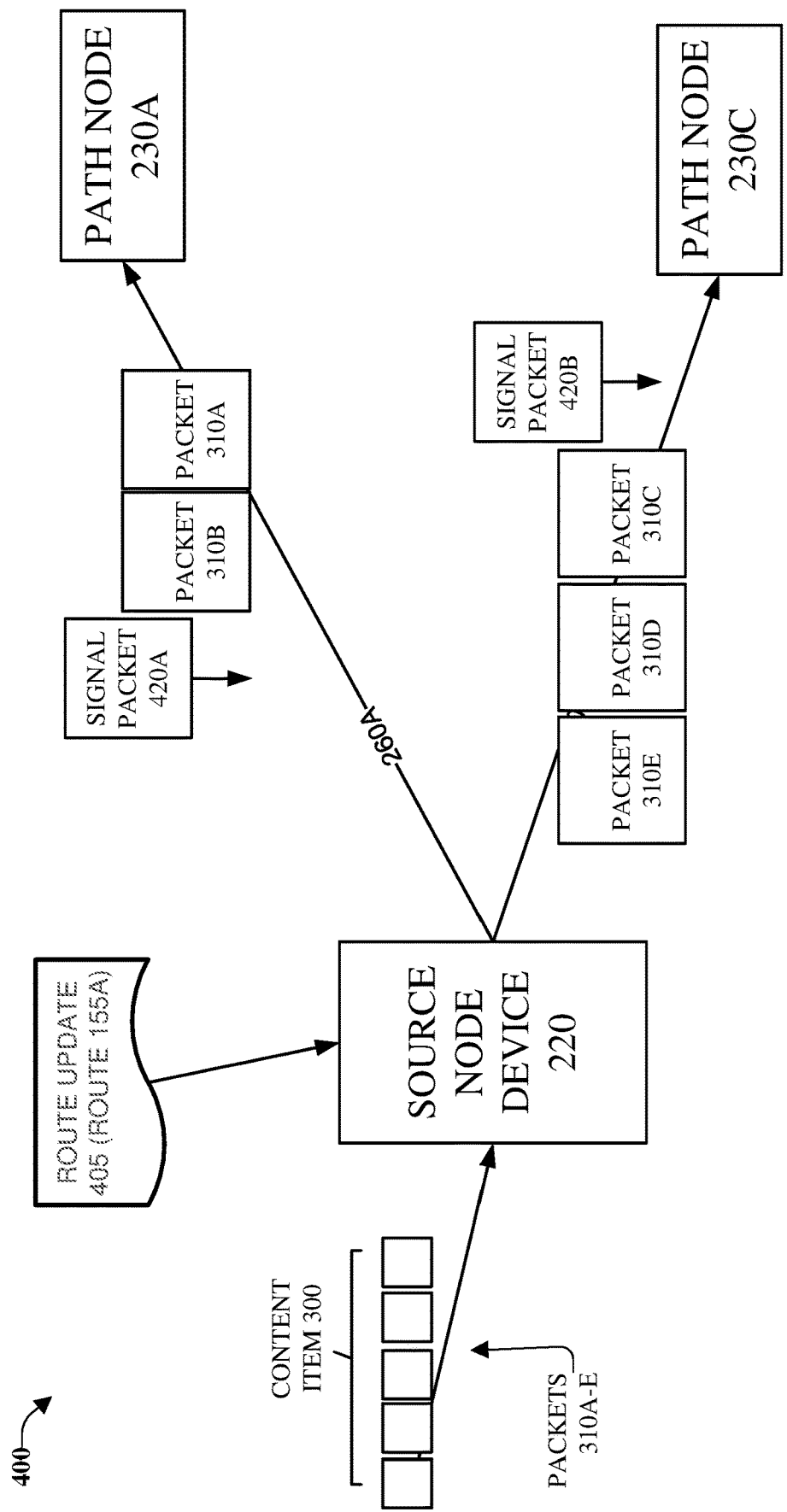
FIG. 4 illustrates an example node diagram of a part of a network with components that can implement a system for selectively rerouting portions of content items, in accordance with one or more embodiments.

Because portions 390A-B can be relayed on separate routes to destination router device 270, one or more embodiments can use different approaches to linking portions 390A-B in order when they arrive at destination router device 270. An example approach that can be used by one more embodiments is the appending (e.g., by signaling component 129) of a separation indicator to one or all of the portions used to convey the content item. This example approach is discussed further with FIGS. 4-5 below, including a description of example content of different separation indicators, and different ways that separation indicators can be appended to portions 390A-B FIG. 4 illustrates an example node diagram 400 of a part of network 200 with components that can implement a system for selectively rerouting portions of content items, in accordance with one or more embodiments. For purposes of brevity, description of like elements and/or processes employed in other embodiments is omitted. Node diagram 400 includes content item 300 being received by source node device 220 and path nodes 230A-C being starting points for first route 155A and second route 155B, respectively. For an illustration of example approaches to rerouting, packets 310A-E discussed with FIG. 3, are depicted with signal packets 420A-B. As an example cause for the rerouting depicted in FIG. 4, route update 405 is received by source node device 220.

As discussed above, network 200 can be a packet switched network, with content item 300 separated into packets 310A-E for transmission. In this example, source node device 220 can receive content item 300 a packet at a time. As noted above, one type of routing device that can be used to implement one or more embodiments is a routing device that frequently identifies information about different routes to destination router device 270, and distributes the information to other routing devices. Further, when source node device 220 receives route update 405 during the relay of content item 300 on first route 155A, a rerouting of the not yet relayed portion of content item 300 (e.g., second portion 390B) can be performed by one or more embodiments.

As noted with FIG. 3 above Because portions 390A-B can be relayed on separate routes to destination router device 270, one or more embodiments can use different approaches to linking portions 390A-B in order when they arrive at destination router device 270. An example approach that can be used by one more embodiments is the appending by signaling component 129 of a separation indicator to one or all of the portions used to convey the content item. In this example, a separation indicator can be appended to both portions 390A-B, with this indicator providing information that can link the first portion to the second portion at destination router device 270.

In an example depicted in FIG. 4, first portion 390A of packets 310A-B, which have already been relayed along first route 155A via path node 230A, can have signal packet 420A appended thereto, this type of packet also being termed a trailing packet. Similarly, before the first packet of second portion 390B of packets 310C-E is relayed along second route 155B, signal packet 420B is appended to the beginning of second portion 155B, this packet also being termed a leading packet.

In one or more embodiments, signal packets 420A-B can be comprised of information that, when portions 390A-B are received by destination router device 270, can be used to reconstruct content item 300, e.g., with no loss of content, and without the latency caused by buffering resending, and lost packets. Processing of portions 390A-B by destination node 270 is described with FIG. 5 below.

In example content for signal packet 420A, this trailing packet can identify the existence of second portion 390B, as well as other relevant information. Additional information can include, but is not limited to, an age of second portion 390B, e.g., such that it can be abandoned in a timely fashion, if needed.

In an alternative embodiment, the separation indicating information of signal packets 420A-B can be appended into packets of portions 390A-B, e.g., instead of adding packets to the portions. In an example implementation, the linking information described above for signal packets 420A-B could be added to headers 312B-C of packets 310B-C respectively, e.g., instead of adding a signal packet at the end of first portion 390A, the separation information can be added into the last packet of the portion, header 312B of packet 310B. Similarly, instead of adding a signal packet at the beginning of second portion 390B, the separation information required to link the portions can be added to the first packet of the second portion 390B, e.g., header 312C of packet 310C.

Figure 5:
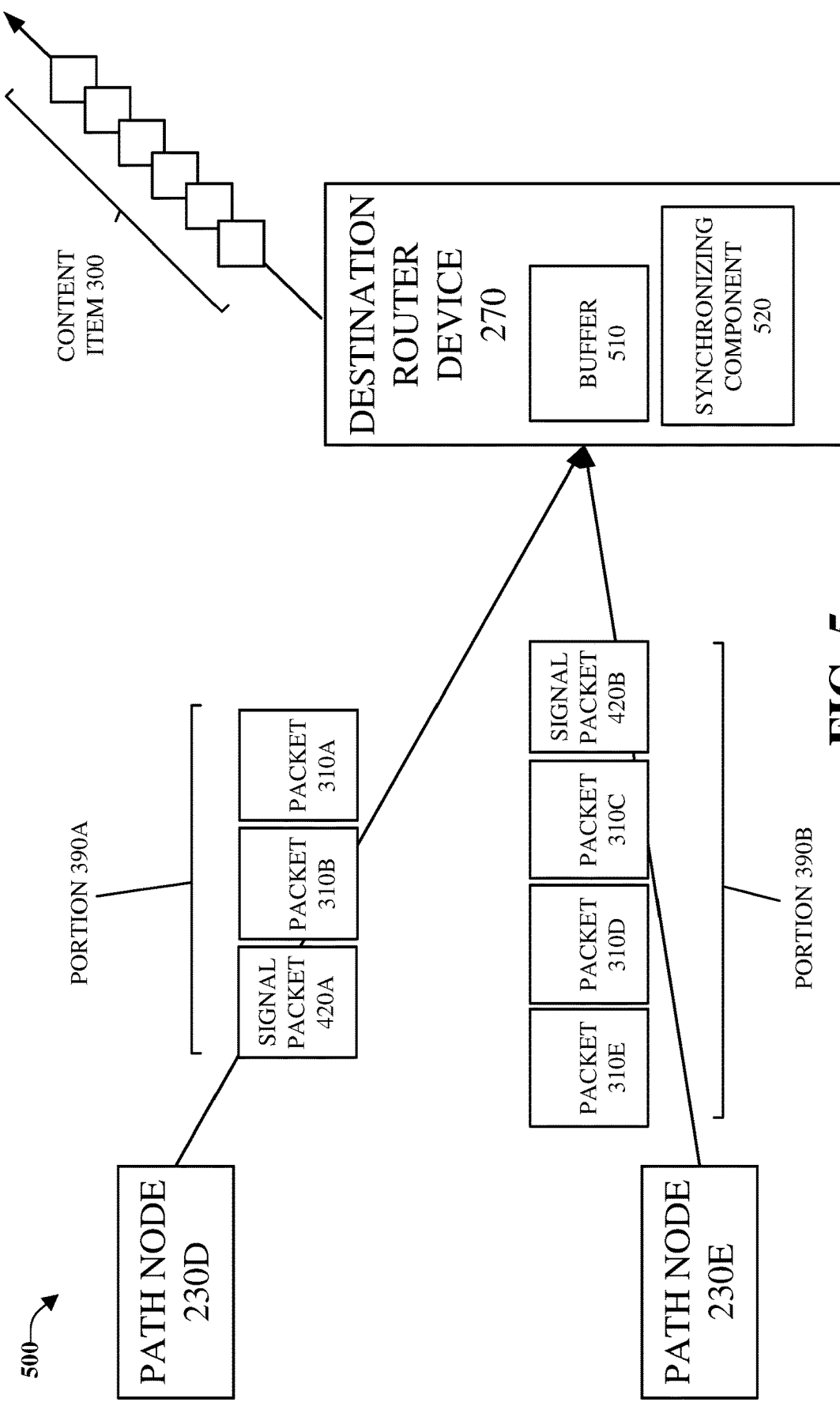
FIG. 5 illustrates an example node diagram of another part of network with components that can implement a system for selectively rerouting portions of content items, in accordance with one or more embodiments.

FIG. 5 illustrates an example node diagram 500 of another part of network 200 with components that can implement a system for selectively rerouting portions of content items, in accordance with one or more embodiments. For purposes of brevity, description of like elements and/or processes employed in other embodiments is omitted. Node diagram 500 includes content item 300 being relayed by destination router device 270 after being received as portions 390A-B from path nodes 230D-E respectively.

Continuing the illustration of example approaches to rerouting of FIG. 4, packets 310A-B and 310C-E are depicted in portions 390A-B with signal packets 420A-B, respectively. In one or more embodiments, first portion 390A can be received at a different time than second portion 390B, e.g., the arrival time of portion 390A can be before the arrival time of portion 390B, or vice-versa, with each of these circumstances being discussed below.

With respect to an example where portion 390A arrives before the arrival time of portion 390B, in one or more embodiments, upon receipt of the packets of first portion 390A (e.g., including signal packet 420A), based on indications in signal packet 420A, destination node device 270 can strip signal packet 420A, and forward packets 310A-B on to a destination node. When portion 390B arrives, signal packet 420B can be removed, and packets 310C-E can be forwarded on to the destination node after packets 310A-B, thereby reordering the packets into their original order, e.g., as content item 300.

In a variation of this example where portions 390B never arrives (e.g., by loss or corruption of one or more of signal packet 420B and 310C-E), then this missing part is handled by parts of the receiving node, e.g., transport layer protocols such as TCP can handle ignoring the lost data and using available packets 310A-B (e.g., a garbled voice over IP signal), or request for retransmission of the missing packets 310C-E, e.g., download of an encrypted file. With respect to transport layers, except for the buffering of packets in some circumstances described below, one or more embodiments can be characterized as handling packets in accordance with User Datagram Protocol (UDP) layer, e.g., packets are forwarded regardless of other, missing packets, with retransmission requests handled by other protocols.

With respect to an example where portion 390B arrives before the arrival time of portion 390A, in one or more embodiments, upon receipt of the packets of second portion 390B (e.g., including signal packet 420B), the existence and status (e.g., in transit) of first portion 390A is available to destination router device 270. Based on this presence of second portion 390B of packets to be rejoined, packets 310C-E can be buffered by destination router device 270 in buffer 510, and signal packet 420B can be removed from the buffered portion 390B. In this approach, when portion 390A arrives, signal packet 420A can be removed, and received packets 310A-B, and buffered packets 390C-E can be forwarded on in their original order to a destination node for use, e.g., as content item 300.

In an example where portion 390A never arrives, different approaches can be used by one or more embodiment. In one approach, a timeout time can be applied to the buffered portion 390B and, after this time expires, portion 390B can be released on to the destination node. This is similar to the example described above where portion 390B never arrives, when portion 390A never arrives, portion 390B can be forwarded from buffer 510 and handed in accordance with network protocols.

In an alternative embodiment for the circumstance where portion 390B arrives before the arrival time of portion 390A, in one or more embodiments, based on different circumstances, portion 390B can be forwarded (including signal packet 420B) before the receipt by destination router device 270 of portion 390A. In this approach, the rejoining of portions 390A and 390B, similar to the previously discussed embodiment for this circumstance (e.g., by buffering of portion 390B), can be performed at the destination node.

With respect to the previous arrival time examples, it should be noted that, in many circumstances, portion 390A will not arrive before portion 390B because portion 390B has traveled on a route predicted to be faster than the original route to be traveled by portion 390A when the rerouting was caused to occur. When this circumstance occurs, one or more embodiments can use the specifics of the prediction, and the results, to adjust and improve the different aspects of the rerouting process.

Figure 6:
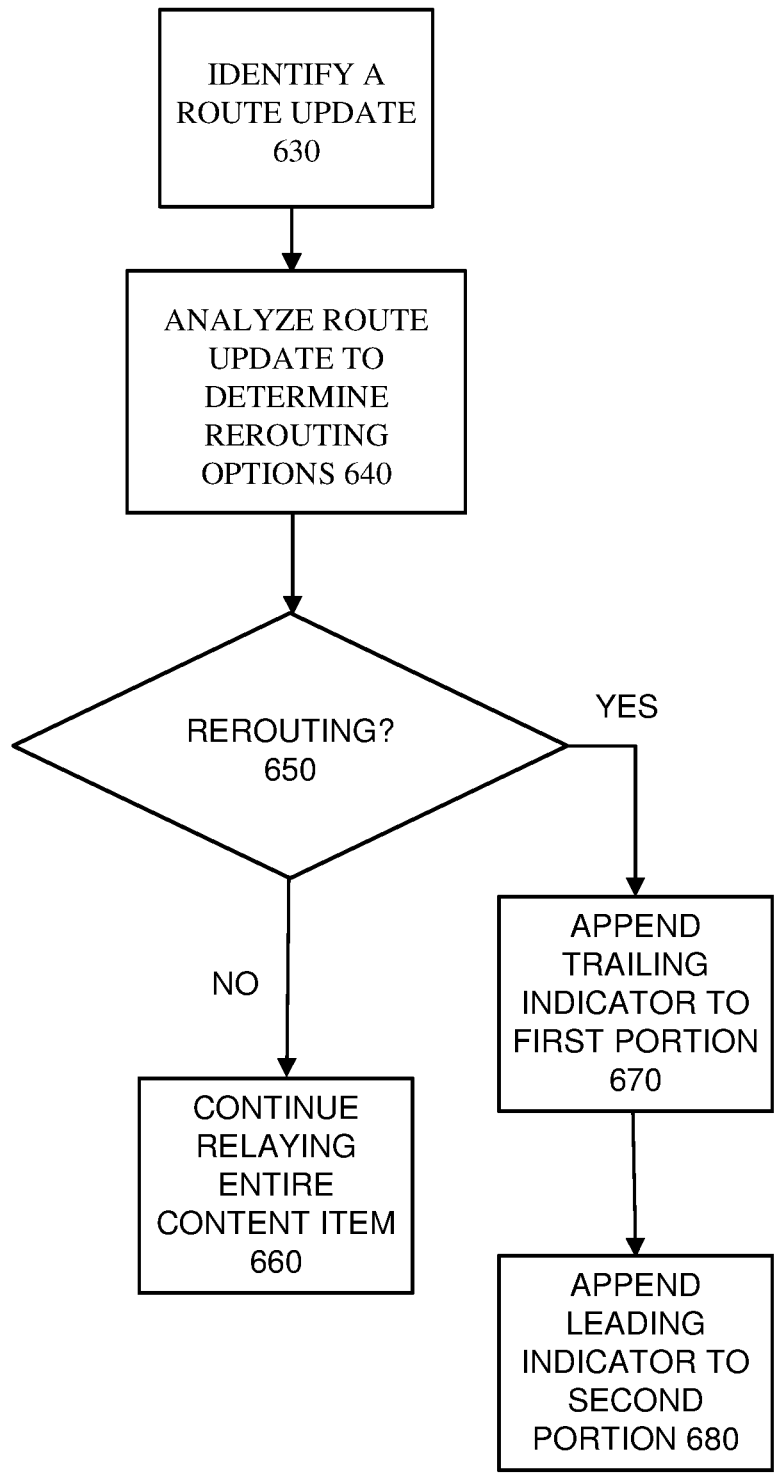
FIG. 6 depicts an example flow diagram illustrating an approach to selectively rerouting content items.

FIG. 6 depicts an example flow diagram 600 illustrating an approach to selectively rerouting content items. For purposes of brevity, description of like elements and/or processes employed in other embodiments is omitted.

At 630, in one or more embodiments, a route update can be identified. For example, in one or more embodiments, a route update 405 can be identified, e.g., by route update identifying component 125. At 640, in one or more embodiments, the route update can be analyzed to determine rerouting options. For example, in one or more embodiments, route update 405 can be analyzed to determine rerouting options, e.g., by rerouting component 126.

At 650, in one or more embodiments, when rerouting is selected, at 670, a trailing indicator can be appended to a first portion of packets of a content item. Further, at 580, in one or more embodiments, a leading indicator can be appended to a second portion of the content item. For example, in one or more embodiments, when rerouting is selected, a trailing indicator (e.g., signal packet 420A can be appended to first portion 390A) can be appended to a first portion of packets of a content item. Further, at 680, in one or more embodiments, a leading indicator can be appended to a second portion of the content item. For example, in one or more embodiments, a leading indicator (e.g., signal packet 420B) can be appended to second portion 390B of content item 300. At 650, in one or more embodiments, when rerouting is not selected, at 660, in one or more embodiments, the content item can be relayed to a next hop without rerouting.

Figure 7:
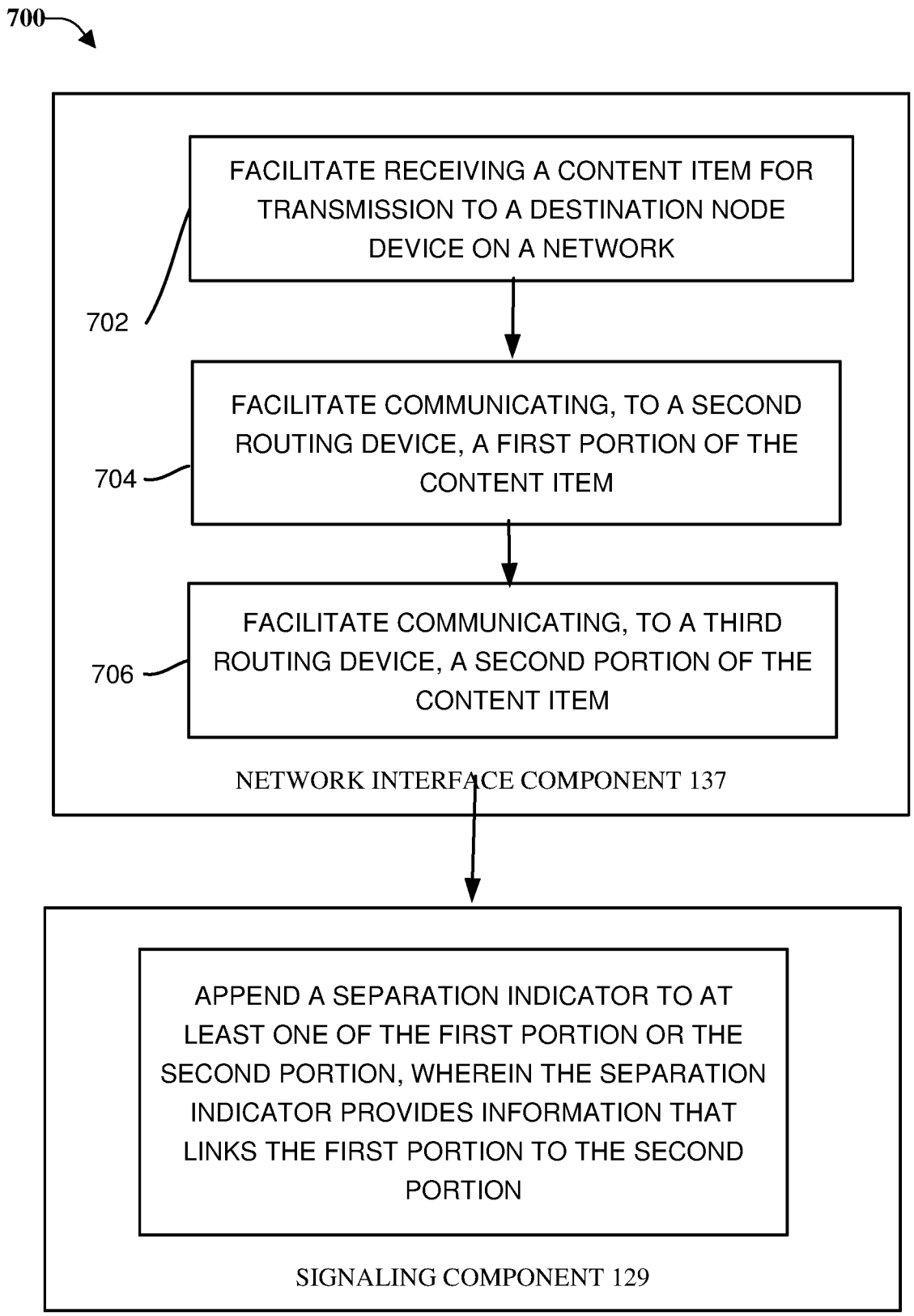
FIG. 7 is a flow diagram representing example operations of an example system comprising a route update identifying component, and route update evaluating component, that can facilitate selectively sending routing table updates to routing devices, in accordance with one or more embodiments.

FIG. 7 is a flow diagram representing example operations of an example system 700 comprising a route update identifying component 125, and route update evaluating component 126, that can facilitate selectively sending routing table updates to routing devices, in accordance with one or more embodiments. For purposes of brevity, description of like elements and/or processes employed in other embodiments is omitted.

Network interface component 137 can be configured 702 to facilitate receiving a content item for transmission to a router device on a network. For example, in one or more embodiments, network interface component 137 of source routing device 220 can be configured 702 to facilitate receiving a content item 300 for transmission to a destination node 270 device on a network 200.

Network interface component 137 can be further configured 704 to facilitate communicating, to a second routing device, a first portion of the content item. For example, in one or more embodiments, network interface component 137 can be configured 704 to facilitate communicating, to a second routing device (e.g., path node 230A), a first portion 390A of the content item 300.

Network interface component 137 can be further configured 706 to facilitate communicating, to a third routing device, a second portion of the content item. For example, in one or more embodiments, network interface component 137 can be configured 706 to facilitate communicating, to a third routing device (e.g., path node 230C), a second portion 390B of the content item 300.

Rerouting component 137 can be configured 708 to append a separation indicator to at least one of the first portion or the second portion, wherein the separation indicator provides information that links the first portion to the second portion. For example, in one or more embodiments, rerouting component 137 can be configured 708 to append a separation indicator (e.g., signal packet 420A or 420B) to at least one of the first portion 390A or the second portion 390B, wherein the separation indicator (e.g., signal packet 420A or 420B, respectively) provides information that links the first portion 390A to the second portion 390B.

Figure 8:
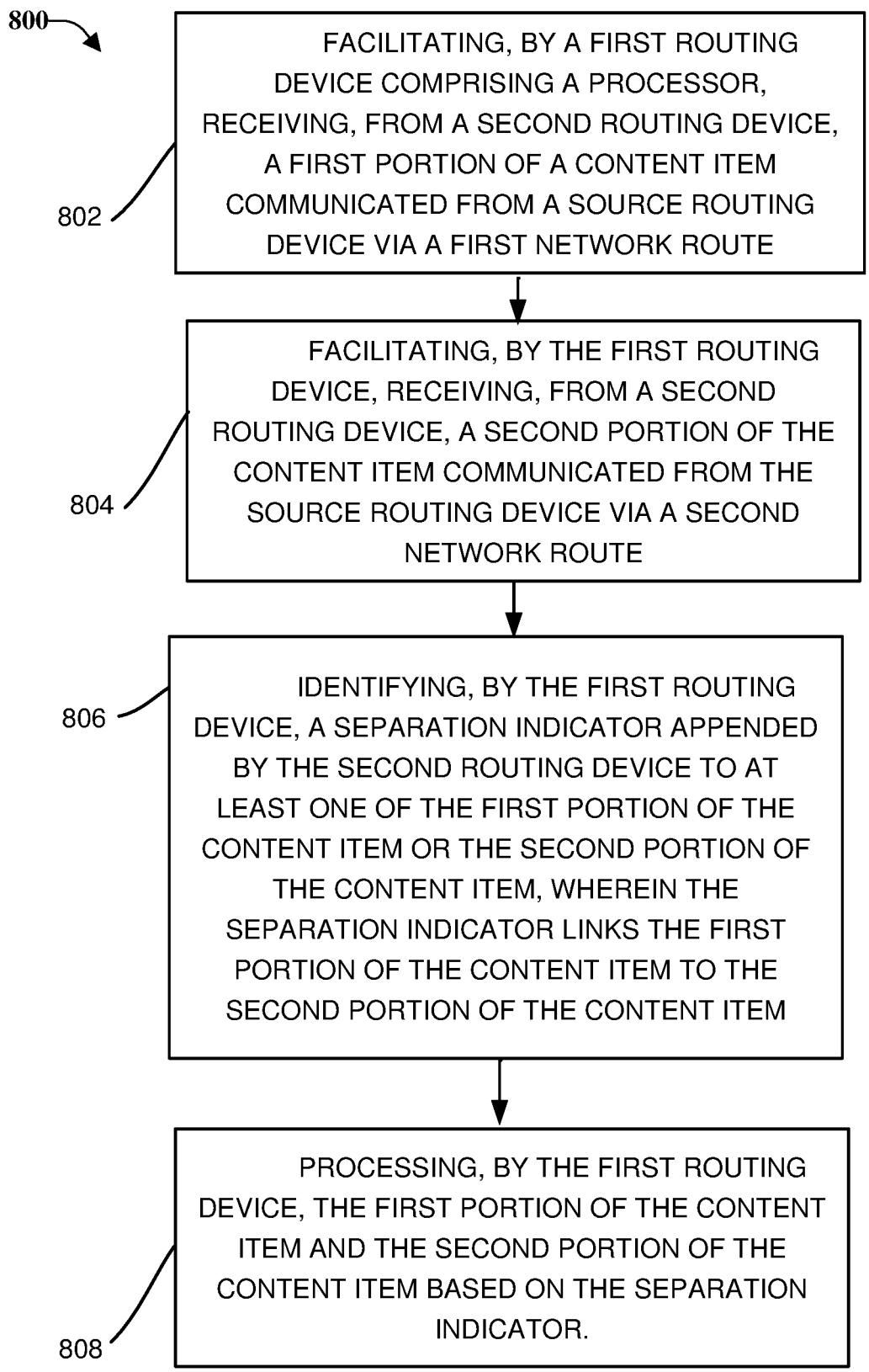
FIG. 8 illustrates a flow diagram of an example method that can facilitate selectively sending routing table updates to routing devices, in accordance with one or more embodiments.

FIG. 8 illustrates a flow diagram of an example method 800 that can facilitate selectively rerouting network traffic, in accordance with one or more embodiments. For purposes of brevity, description of like elements and/or processes employed in other embodiments is omitted.

At 802, method 800 can comprise facilitating, by a first routing device comprising a processor, receiving, from a second routing device, a first portion of a content item communicated from a source routing device via a first network route. For example, in one or more embodiments, a method can comprise facilitating, by a first routing device (e.g., destination router device 270) comprising a processor 160, receiving, (e.g., by network interface component 137) from a second routing device (e.g., path node 230D), a first portion 390A of a content item 300 communicated from a source routing device (e.g., source node device 220) via a first network route 250A.

At 804, method 800 can comprise facilitating, by the first routing device, receiving, from a third routing device, a second portion of the content item communicated from the source routing device via a second network route. For example, in one or more embodiments, a method can comprise facilitating, by (e.g., by network interface component 137) the first routing device (e.g., destination router device 270), receiving, from a third routing device (e.g., path node 230D), a second portion 390B of the content item 300 communicated from the source routing device 220 via a second network route 250B.

At 806, method 800 can comprise identifying, by the first routing device, a separation indicator appended by the source routing device to at least one of the first portion of the content item or the second portion of the content item, wherein the separation indicator links the first portion 390A of content item 300 to the second portion of content item. For example, in one or more embodiments, a method can comprise identifying, by the first routing device (e.g., destination router device 270), a separation indicator (e.g., signal packet 420A-B) appended by the source routing device 220 to at least one of the first portion of the content item 300 or the second portion 290B of content item 300, wherein the separation indicator (e.g., signal packet 420A-B) links the first portion 390A of content item 300 to the second portion 390B of the content item 300.

At 808, method 800 can comprise processing, by the first routing device, the first portion of the content item and the second portion of the content item based on the separation indicator. For example, in one or more embodiments, a method can comprise, processing, by the first routing device, the first portion of the content item and the second portion of the content item based on the separation indicator.

Figure 9:
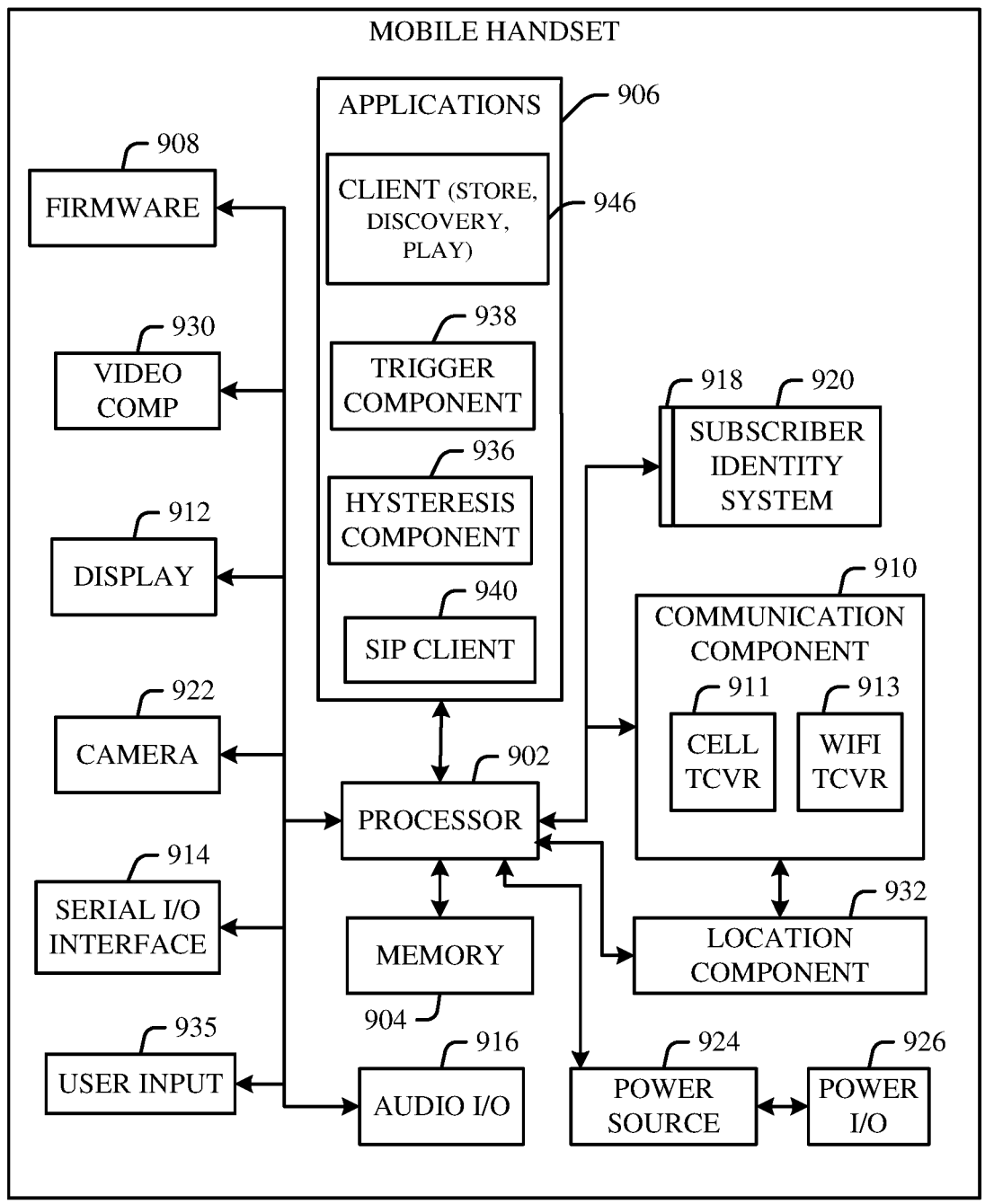
FIG. 9 illustrates an example block diagram of a mobile handset operable to engage in a system architecture that facilitates wireless communications according to one or more embodiments described herein.

FIG. 9 illustrates an example block diagram of a mobile handset 900 operable to engage in a system architecture that facilitates wireless communications according to one or more embodiments described herein. For purposes of brevity, description of like elements and/or processes employed in other embodiments is omitted.

Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

One or more devices described herein can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

One or more embodiments can employ various cellular systems, technologies, and modulation schemes to facilitate wireless radio communications between devices (e.g., UEs 140A-B, and 310, and the network devices 150 and 350). While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, a wireless communication system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like.

However, various features and functionalities of system 100 are particularly described wherein the devices (e.g., the UEs 140A-B and the network device 150) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
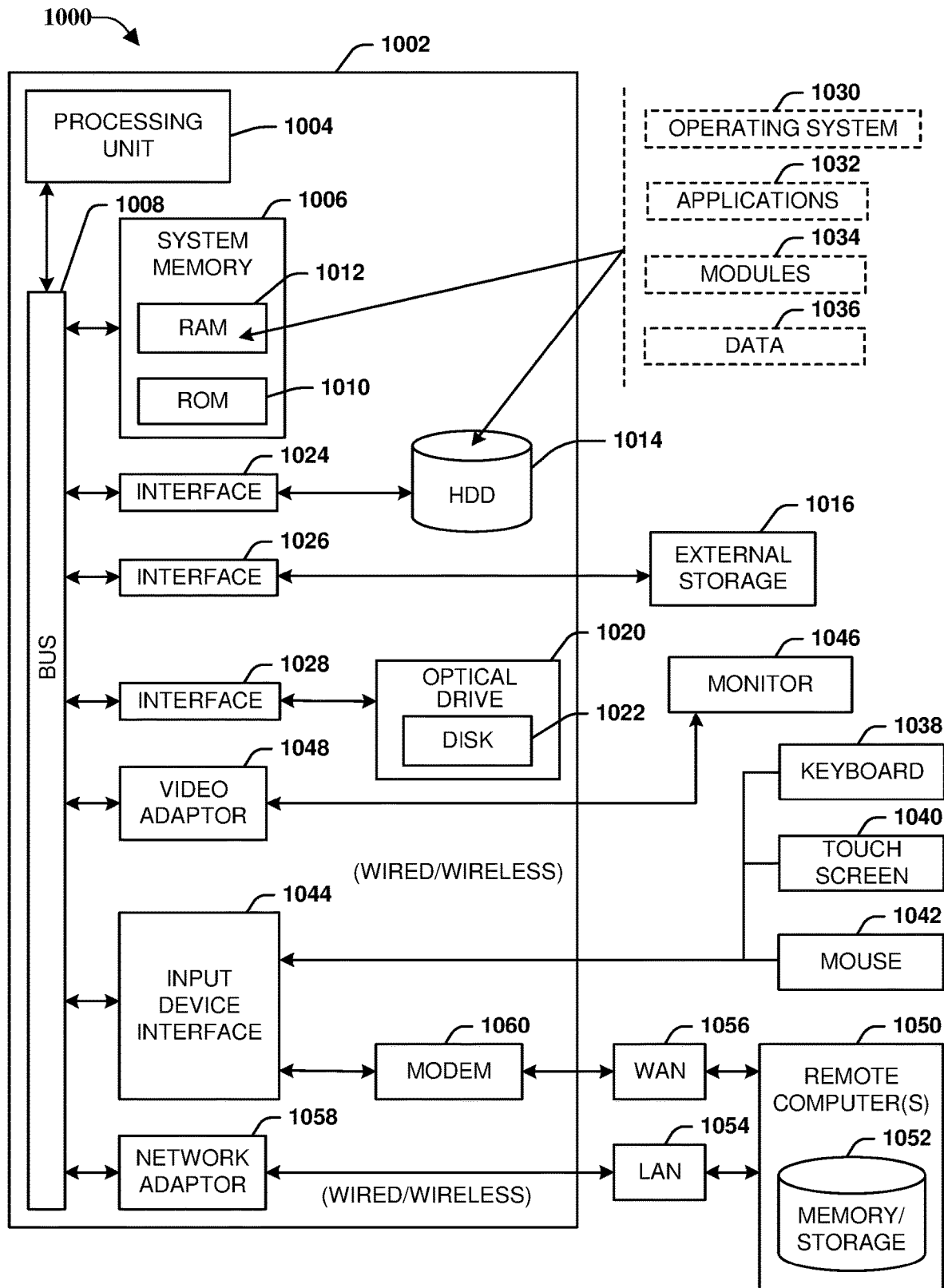
FIG. 10 illustrates an example block diagram of an example computer operable to engage in a system architecture that can facilitate processes described herein, in accordance with one or more embodiments.

Referring now to FIG. 10, in order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather is to be construed in breadth, spirit and scope in accordance with the appended claims.

What is claimed is:

1. A first routing device, comprising:
 a processor; and
 a memory that stores executable instructions that, when executed by the processor, facilitate performance of operations, comprising:
  receiving a content item for transmission to a destination router device on a network;
  communicating, to a second routing device, a first portion of the content item;
  communicating, to a third routing device, a second portion of the content item; and
  appending a separation indicator to at least one of the first portion or the second portion, wherein the separation indicator provides information that:
   links the first portion to the second portion, and
   indicates a time when a division of the content item into the first portion and the second portion occurred, wherein the second portion of the content item is received by the destination router device before the first portion of the content item, and wherein the time is provided with the separation indicator to facilitate abandoning the first portion of the content item after a duration has elapsed from when a separation of the content item occurred.

2. The first routing device of claim 1, wherein the content item is divided for transmission into packets, and wherein the first portion comprises a first packet portion of the packets and the second portion comprises a second packet portion of the packets.

3. The first routing device of claim 2, wherein the separation indicator comprises a separation indicator packet appended either before an initial packet of the first packet portion or after an ending packet of the second packet portion.

4. The first routing device of claim 1, wherein the separation indicator is appended to the second portion of the content item to facilitate, upon receipt of the first portion of the content item by the destination router device, buffering, by the destination router device, the second portion of the content item until the first portion of the content item is received by the destination router device.

5. The first routing device of claim 4, wherein the separation indicator is appended to the second portion of the content item further to facilitate, by the destination router device:
rejoining the second portion of the content item to the first portion of the content item; and
forwarding the content item to a storage device.

6. The first routing device of claim 1, wherein the separation indicator is appended to the first portion of the content item to facilitate forwarding the first portion of the content item to a storage device upon receipt of the first portion of the content item.

7. The first routing device of claim 1, wherein the operations further comprise dividing the content item into the first portion of the content item and the second portion of the content item, based on an indication to reroute the content item from a first route to the destination router device to a second route to the destination router device.

8. The first routing device of claim 7, wherein the indication to reroute the content item is based on a routing update specifying the second route to the destination router device satisfies a criterion.

9. The first routing device of claim 8, wherein the criterion satisfied by the second route comprises the second route being predicted to deliver the content item to the destination router device with a shorter transit time than a longer transit time predicted to deliver the content item to the destination router device by the first route.

10. A method, comprising:
identifying, by first network equipment comprising a processor, a content item for transmission to destination router equipment via a network;
facilitating, by the first network equipment, communicating, to second network equipment, a first portion of the content item;
facilitating, by the first network equipment, communicating, to third network equipment, a second portion of the content item; and
appending a signal indicator to at least one of the first portion or the second portion, wherein the signal indicator comprises indications that:
link the first portion to the second portion, and
indicate a time elapsed since a separation of the content item into the first portion and the second portion occurred, wherein the second portion of the content item is received by the destination router device before the first portion of the content item, and wherein the time elapsed is indicated with the signal indicator to facilitate abandoning the first portion of the content item after a duration has elapsed from when the separation of the content item occurred.

11. The method of claim 10, wherein the content item is divided for transmission into packets, and wherein the first portion comprises a first packet portion of the packets and the second portion comprises a second packet portion of the packets.

12. The method of claim 11, wherein the separation indicator comprises a separation indicator packet appended before an initial packet of the first packet portion or after an ending packet of the second packet portion.

13. The method of claim 10, wherein the separation indicator is appended to the second portion of the content item to facilitate, upon receipt of the first portion of the content item by the destination router equipment, buffering, by the destination router equipment, the second portion of the content item until the first portion of the content item is received by the destination router equipment.

14. The method of claim 13, wherein the separation indicator is appended to the second portion of the content item to further facilitate, by the destination router equipment:
rejoining the second portion of the content item to the first portion of the content item; and
forwarding the content item to a storage device.

15. The method of claim 10, wherein the separation indicator is appended to the first portion of the content item to facilitate forwarding the first portion of the content item to storage equipment upon receipt of the first portion of the content item.

16. The method of claim 10, further comprising dividing, by the first network equipment, the content item into the first portion of the content item and the second portion of the content item, based on an indication to reroute the content item from a first route to the destination router equipment to a second route to the destination router equipment.

17. The method of claim 16, wherein the indication to reroute the content item is based on a routing update specifying the second route to the destination router equipment satisfies a criterion.

18. A non-transitory machine-readable medium, comprising executable instructions that, when executed by a processor of first network equipment, facilitate performance of operations, comprising:
identifying a content item for transmission to destination router equipment via a network;
communicating to second network equipment, a first portion of the content item;
communicating to third network equipment, a second portion of the content item; and
appending a signal indicator to at least one of the first portion or the second portion, wherein the signal indicator comprises indications that:
link the first portion to the second portion, and
indicate a time elapsed since a separation of the content item into the first portion and the second portion occurred, wherein the second portion of the content item is received by the destination router device before the first portion of the content item, and wherein the time elapsed is indicated with the signal indicator to facilitate abandoning the first portion of the content item after a duration has elapsed from when the separation of the content item occurred.

19. The non-transitory machine-readable medium of claim 18, wherein the content item is divided for transmission into packets, and wherein the first portion comprises a first packet portion of the packets and the second portion comprises a second packet portion of the packets.

20. The non-transitory machine-readable medium of claim 19, wherein the separation indicator comprises a separation indicator packet appended either before an initial packet of the first packet portion or after an ending packet of the second packet portion.

\* \* \* \* \*